(12) United States Patent
Kim et al.

(10) Patent No.: US 8,574,752 B2
(45) Date of Patent: Nov. 5, 2013

(54) ELECTRODE ASSEMBLY AND RECHARGEABLE BATTERY USING THE SAME

(75) Inventors: Min-Hee Kim, Suwon-si (KR); Takaya Saito, Suwon-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 679 days.

(21) Appl. No.: 12/713,144

(22) Filed: Feb. 25, 2010

(65) Prior Publication Data

US 2011/0104561 A1    May 5, 2011

Related U.S. Application Data

(60) Provisional application No. 61/256,230, filed on Oct. 29, 2009.

(51) Int. Cl.
  *H01M 2/02* (2006.01)
  *H01M 2/18* (2006.01)

(52) U.S. Cl.
  USPC ............................................. 429/178

(58) Field of Classification Search
  None
  See application file for complete search history.

(56) References Cited

U.S. PATENT DOCUMENTS

| | | | |
|---|---|---|---|
| 5,925,482 A | 7/1999 | Yamashita | |
| 7,033,697 B2 | 4/2006 | Park et al. | |
| 7,931,980 B2 | 4/2011 | Kwak et al. | |
| 2002/0142211 A1 | 10/2002 | Nakanishi et al. | |
| 2004/0202928 A1 | 10/2004 | Miyamoto et al. | |
| 2005/0202319 A1 | 9/2005 | Kim | |
| 2007/0009803 A1 | 1/2007 | Kim et al. | |
| 2007/0281206 A1 | 12/2007 | Fujikawa et al. | |
| 2007/0292765 A1* | 12/2007 | Inoue et al. | 429/246 |
| 2008/0026293 A1* | 1/2008 | Marple et al. | 429/231.95 |

(Continued)

FOREIGN PATENT DOCUMENTS

| | | |
|---|---|---|
| CN | 1713417 A | 12/2005 |
| CN | 101312244 A | 11/2008 |

(Continued)

OTHER PUBLICATIONS

KIPO Notice of Allowance dated Aug. 2, 2012, for corresponding Korean Patent application 10-2010-0062883, (5 pages).

(Continued)

*Primary Examiner* — Barbara Gilliam
*Assistant Examiner* — Stephan Essex
(74) *Attorney, Agent, or Firm* — Christie, Parker & Hale, LLP

(57) ABSTRACT

A rechargeable battery includes an electrode assembly including a positive electrode including a positive current collector, a positive active material on the positive current collector in a positive coating region, and a positive uncoated region in which the positive active material is not on the positive current collector at a first side of the electrode assembly; a negative electrode including a negative current collector, a negative active material on the negative current collector in a negative coating region, a first negative uncoated region in which the negative active material is not on the negative current collector at the first side of the electrode assembly, and a second negative uncoated region in which the negative active material is not on the negative current collector at a second side of the electrode assembly opposite the first side; and a separator between the positive electrode and the negative electrode.

20 Claims, 5 Drawing Sheets

(56) References Cited

U.S. PATENT DOCUMENTS

| | | |
|---|---|---|
| 2008/0292966 A1 | 11/2008 | Bak et al. |
| 2009/0087733 A1 | 4/2009 | Yoon et al. |
| 2009/0092889 A1 | 4/2009 | Hwang et al. |
| 2010/0081042 A1* | 4/2010 | Morishima et al. ............ 429/94 |
| 2010/0273036 A1 | 10/2010 | Marple et al. |

FOREIGN PATENT DOCUMENTS

| | | |
|---|---|---|
| EP | 1 998 401 A2 | 12/2008 |
| JP | 09-306471 | 11/1997 |
| JP | 2002-110134 | 4/2002 |
| JP | 2003-168417 | 6/2003 |
| JP | 2004-259625 | 9/2004 |
| JP | 2004-335335 | 11/2004 |
| JP | 2005-063680 | 3/2005 |
| JP | 2007-324073 | 12/2007 |
| JP | 2008-123848 | 5/2008 |
| JP | 2008-293980 | 12/2008 |
| JP | 2009-094068 | 4/2009 |
| JP | 2009-545122 | 12/2009 |
| KR | 10-2006-0126416 | 12/2006 |
| KR | 10-2007-0005341 A | 1/2007 |
| KR | 10-2008-0047635 A | 5/2008 |
| KR | 10-2009-0006565 A | 1/2009 |
| KR | 10-0922352 B1 | 10/2009 |
| WO | WO 2006/061940 A1 | 6/2006 |
| WO | WO 2008/013853 A2 | 1/2008 |

OTHER PUBLICATIONS

Patent Abstracts of Japan, and English machine translation of Japanese Publication 2008-123848 listed above, (10 pages).

SIPO Office action daed Jan. 7, 2013, for corresponding Chinese Patent application 201010527721.X, with English translation, (13 pages).

JPO Office action dated Mar. 5, 2013, for corresponding Japanese Patent application 2010-234172, (2 pages).

Patent Abstracts of Japan, and English machine translation of Japanese Publication 2005-063680, (15 pages).

Patent Abstracts of Japan, and English machine translation of Japanese Publication 2008-293980, (17 pages).

European Search Report dated Mar. 25, 2011, for corresponding European Patent application 10188980.6, noting listed references in this IDS.

JPO Office action dated Jun. 25, 2013, for corresponding Japanese Patent application 2010-234172, (3 pages).

Patent Abstracts of Japan, and English machine translation of Japanese Publication 2002-110134 dated Apr. 12, 2002, listed above, (9 pages).

Patent Abstracts of Japan, and English machine translation of Japanese Publication 2004-335335 dated Nov. 25, 2004, listed above, (13 pages).

* cited by examiner

ELECTRODE ASSEMBLY AND RECHARGEABLE BATTERY USING THE SAME

CROSS-REFERENCE TO RELATED APPLICATION

This application claims the benefit of U.S. Provisional Application No. 61/256,230 filed on Oct. 29, 2009, in the United States Patent and Trademark Office, the disclosure of which is incorporated herein in its entirety by reference.

BACKGROUND

1. Field

Aspects of embodiments of the present invention relate to an electrode assembly and a rechargeable battery using the same.

2. Description of the Related Art

Unlike a primary battery that cannot be recharged, a rechargeable battery can be repeatedly charged and discharged. Low-capacity rechargeable batteries are used for portable compact electronic apparatuses such as mobile phones, notebook computers, and camcorders, and high-capacity rechargeable batteries are widely used as a power source for driving a motor of a hybrid vehicle and the like.

A high-power rechargeable battery using a non-aqueous electrolyte with high energy density has been recently developed. For example, the high-power rechargeable battery may be constructed as a high-capacity rechargeable battery having a plurality of rechargeable cells coupled to each other in series such that it can be used as the power supply for driving motors in electric vehicles requiring high power.

In addition, one high-capacity rechargeable battery is commonly formed with a plurality of rechargeable cells coupled to each other in series. The rechargeable battery may have a cylindrical shape, a prismatic shape, a pouch shape, or other shape.

An electrode assembly includes a positive electrode, a negative electrode, and a separator disposed between the positive and negative electrodes. Here, the separator separates the positive electrode and the negative electrode to prevent a short-circuit therebetween, and absorbs electrolyte required for a battery reaction to maintain high ion conductivity.

When internal temperature of the rechargeable battery increases due to overcharge, the separator may contract or be melted so that a short-circuit may occur between the positive electrode and the negative electrode. When the short-circuit occurs, the internal temperature of the rechargeable battery is rapidly increased so that the rechargeable battery may combust or explode.

The short-circuit may be a short-circuit between a positive active material layer and a negative active material layer, a short-circuit between a positive active material layer and a negative current collector, a short-circuit between a negative active material layer and a positive current collector, or a short-circuit between a positive current collector and a negative current collector. Considering a temperature increase during the short-circuit, it has been determined that a short-circuit between the negative active material layer and the positive current collector is the most dangerous, and a short-circuit between the positive current collector and the negative current collector is the least dangerous.

However, when the positive uncoated region and the negative uncoated region are respectively formed at opposite sides of the electrode assembly, the positive uncoated region and the negative active material layer may possibly be short-circuited rather than the positive and negative current collectors being short-circuited. As described, when the positive uncoated region and the negative active material layer are short-circuited, excessive heat is generated so that the rechargeable battery may combust or explode.

The above information disclosed in this Background section is only for enhancement of understanding of the background of the invention and therefore it may contain information that does not form the prior art that is already known in this country to a person of ordinary skill in the art.

SUMMARY

According to an aspect of embodiments of the present invention, an electrode assembly and a rechargeable battery using the same have improved safety.

According to one embodiment of the present invention, a rechargeable battery includes: an electrode assembly including a positive electrode including a positive current collector, a positive active material on the positive current collector in a positive coating region, and a positive uncoated region in which the positive active material is not on the positive current collector at a first side of the electrode assembly; a negative electrode including a negative current collector, a negative active material on the negative current collector in a negative coating region, a first negative uncoated region in which the negative active material is not on the negative current collector at the first side of the electrode assembly, and a second negative uncoated region in which the negative active material is not on the negative current collector at a second side of the electrode assembly opposite the first side; and a separator between the positive electrode and the negative electrode; a case containing the electrode assembly and having an opening at an end thereof for receiving the electrode assembly; a cap assembly including a cap plate sealing the opening; and a terminal electrically connected to the positive electrode or the negative electrode and protruding outside the case.

In one embodiment, the first negative uncoated region has a width that is less than a width of the second negative uncoated region.

The separator may protrude farther at the first side than the first negative uncoated region, and the positive uncoated region may protrude farther at the first side than the separator. The negative coating region may protrude farther at the first side than the positive coating region.

In one embodiment, the following condition is satisfied: $D1 \leq SQ \leq D2$, where $D1$ is a lateral distance from the first negative uncoated region to an end of the separator at the first side, $D2$ is a lateral distance from the negative coating region to the end of the separator, and $SQ$ is a lateral distance by which the end of the separator is thermally contracted at a reference temperature.

A lateral distance from the first negative uncoated region to an end of the separator at the first side may be about 0.5 mm to about 10 mm. A distance between the positive uncoated region and the first negative uncoated region may be about 0.05 mm to about 0.5 mm.

In one embodiment, the following condition is satisfied: $D3 \leq D2 \leq 30$ mm, where $D2$ is a lateral distance from the negative coating region to an end of the separator at the first side, and $D3$ is a distance between the positive uncoated region and the first negative uncoated region.

In one embodiment, the following condition is satisfied: $(2*D1/SW1)*100(\%) \leq SR1(\%) \leq (2*D2/SW1)*100(\%)$, where $D1$ is a lateral distance from the first negative uncoated region to an end of the separator at the first side, $D2$ is a lateral distance from the negative coating region to the end of the separator, SW1 is a width of the separator before the separator is thermally contracted, and SR1 is a percentage of contraction when the separator is thermally contracted at a reference temperature.

In one embodiment, the separator includes a polymer membrane and a ceramic embedded therein. In one embodiment, the separator includes a porous member and a ceramic layer thereon. In one embodiment, the negative electrode includes a ceramic layer on the negative active material.

The first and second sides of the electrode assembly may be at opposite ends of the electrode assembly along a direction of a winding axis of the electrode assembly.

According to another embodiment of the present invention, a rechargeable battery includes: an electrode assembly including a first electrode including a first current collector, a first active material on the first current collector in a first coating region, and a first uncoated region in which the first active material is not on the first current collector at one side of the electrode assembly; a second electrode including a second current collector, a second active material on the second current collector in a second coating region, a second uncoated region in which the second active material is not on the second current collector at the one side of the electrode assembly, the second uncoated region protruding farther at the one side than the first uncoated region; and a separator between the first electrode and the second electrode; a case containing the electrode assembly; and a terminal electrically connected to the first electrode or the second electrode and protruding outside the case.

The separator may protrude farther at the one side than the first uncoated region. The second uncoated region may protrude farther at the one side than the separator. The first coating region may protrude farther at the one side than the second coating region.

In one embodiment, the following condition is satisfied: D1≤SQ≤D2, where D1 is a lateral distance from the first uncoated region to an end of the separator at the one side, D2 is a lateral distance from the first coating region to the end of the separator, and SQ is a lateral distance by which the end of the separator is thermally contracted at a reference temperature.

A lateral distance from the first uncoated region to an end of the separator at the one side may be about 0.5 mm to about 10 mm. A distance between the first uncoated region and the second uncoated region may be about 0.05 mm to about 0.5 mm.

In one embodiment, the following condition is satisfied: D3≤D2≤30 mm, where D2 is a lateral distance from the first coating region to an end of the separator at the one side, and D3 is a distance between the second uncoated region and the first uncoated region.

In one embodiment, the following condition is satisfied: (2*D1/SW1)*100(%)≤SR1(%)≤(2*D2/SW1)*100(%), where D1 is a lateral distance from the first uncoated region to an end of the separator at the one side, D2 is a lateral distance from the first coating region to the end of the separator, SW1 is a width of the separator before the separator is thermally contracted, and SR1 is a percentage of contraction when the separator is thermally contracted at a reference temperature.

In one embodiment, the separator includes a polymer membrane and a ceramic embedded therein. In one embodiment, the separator includes a porous member and a ceramic layer thereon. In one embodiment, the first electrode includes a ceramic layer on the first active material.

An electrode assembly according to another embodiment of the present invention includes a positive electrode, a negative electrode, and a separator. A positive uncoated region where a positive active material layer is not formed is formed at one side of the positive electrode. A first negative uncoated region where a negative active material layer is not formed is formed at the other side of the negative electrode, and a second negative uncoated region is formed at one side thereof. The separator is disposed between the positive and negative electrodes, and is more protruded to the positive uncoated region than the second negative uncoated region.

A rechargeable battery according to another embodiment of the present invention includes an electrode assembly performing charging and discharging, a case in which the electrode assembly is installed, and a terminal electrically connected to the electrode assembly and protruded to the outside of the case. The electrode assembly includes a positive electrode, a negative electrode, and a separator. A positive uncoated region where a positive active material layer is not formed is formed at one side of the positive electrode. A first negative uncoated region where a negative active material layer is not formed is formed at the other side of the negative electrode, and a second negative uncoated is formed at the one side thereof. The separator is disposed between the positive and negative electrodes and is more protruded to the positive uncoated region than the second negative uncoated region.

According to another aspect of embodiments of the present invention, a ceramic layer is formed on the separator or the negative electrode so that a short-circuit between the positive active material layer and the negative active material layer and a short-circuit between the positive or negative active material layer and the current collector can be prevented or reduced. Furthermore, a short-circuit between the positive current collector and the negative current collector is induced at a high temperature so as to prevent or substantially prevent the internal temperature of the rechargeable battery from being excessively increased.

The above and other features and advantages will become more apparent to those of ordinary skill in the art by describing in detail some exemplary embodiments of the present invention with reference to the attached drawings. Moreover, additional aspects and/or advantages of embodiments of the present invention are set forth in the following description and accompanying drawings, or may be obvious in view thereof to those skilled in the art.

Figure 1:
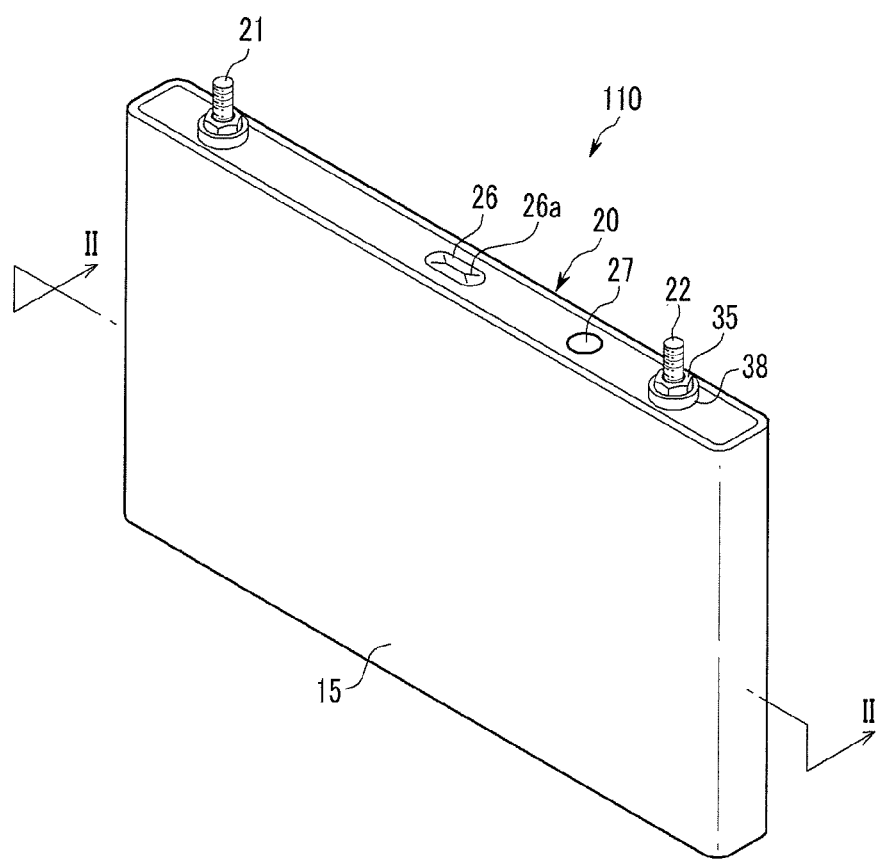
FIG. 1 is a perspective view of a rechargeable battery according to an exemplary embodiment of the present invention.

DESCRIPTION OF REFERENCE NUMERALS
INDICATING SOME ELEMENTS IN THE
DRAWINGS

110: rechargeable battery 10, 50, 60: electrode assembly
11, 51, 61: positive electrode 111, 511, 611: positive current collector
112, 512, 612: positive active material layer
11a, 51a, 61a: positive coating region
11b, 51b, 61b: positive uncoated region
12, 52, 62: negative electrode
121, 521, 621: negative current collector
122, 522, 622: negative active material layer
12a, 52a, 62a: negative coating region
12b: second negative uncoated region
12c, 52b, 62b: first negative uncoated region
13, 53, 63: separator
15: case 20: cap assembly
21: positive terminal 22: negative terminal
531, 623: ceramic layer 532: porous member

DETAILED DESCRIPTION

Some exemplary embodiments will now be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention. Like reference numerals designate like elements throughout the specification and drawings.

Figure 2:
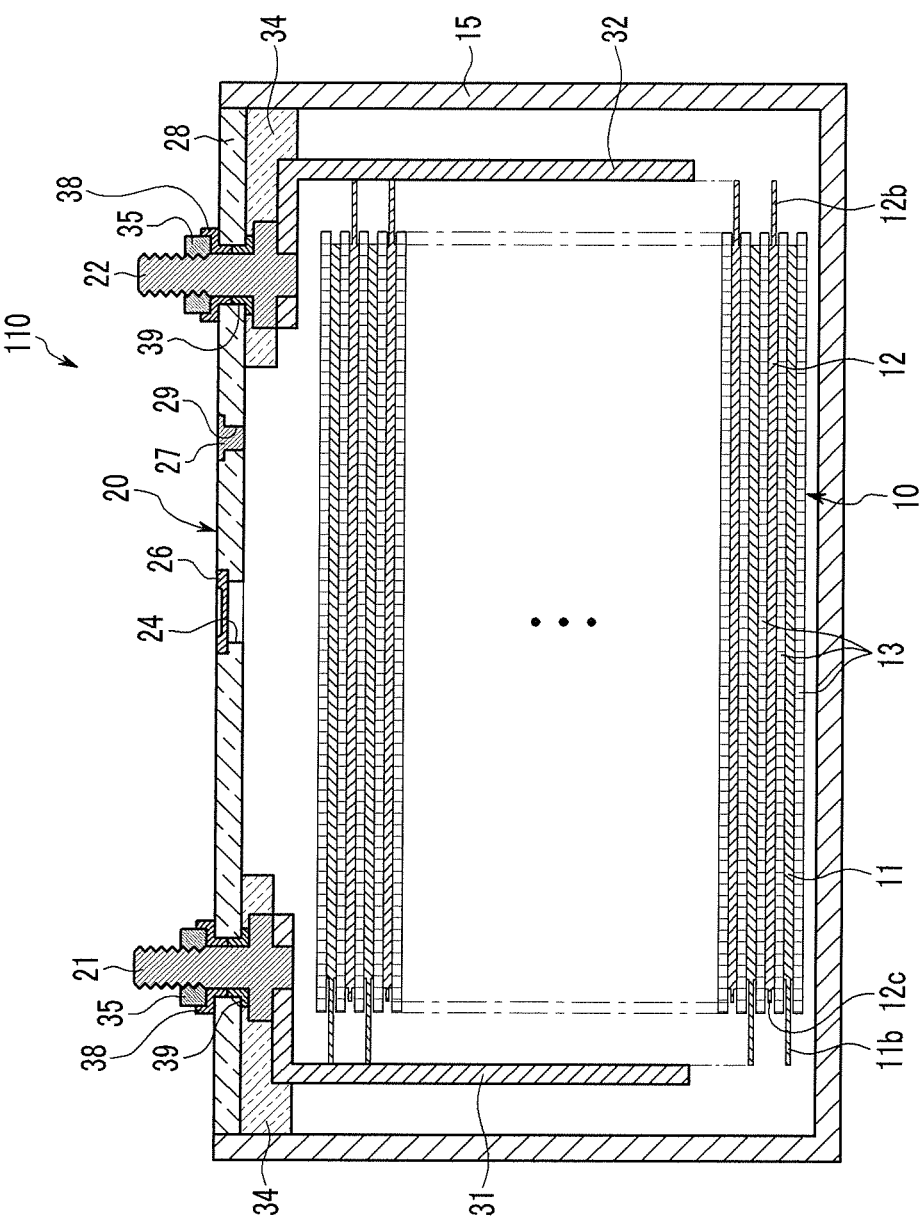
FIG. 2 is a cross-sectional view of the rechargeable battery of FIG. 1, taken along the line II-II.

FIG. 1 is a perspective view of a rechargeable battery according to one exemplary embodiment of the present invention, and FIG. 2 is a cross-sectional view of the rechargeable battery of FIG. 1 taken along the line II-II.

Referring to FIG. 1 and FIG. 2, a rechargeable battery 110 according to one embodiment includes an electrode assembly 10 for performing charging and discharging, a case 15 in which the electrode assembly 10 is installed, and a cap assembly 20 coupled to or combined to an opening of the case 15.

In one embodiment, the rechargeable battery 110 is a lithium ion battery. However, embodiments of the present invention are not limited thereto. That is, other embodiments of the present invention may include various types of batteries, such as a lithium polymer battery.

The case 15, in one embodiment, forms the entire exterior of the rechargeable battery 110, and provides a space for installing the electrode assembly 10 therein. For example, in one embodiment, the case 15 is formed with a cuboid shape having an opening for receiving the electrode assembly 10, also having a cuboid shape. In other embodiments, the case 15 may be formed having any other suitable shape, such as a pouch shape.

Furthermore, the case 15 may be formed from a metal, such as aluminum, an aluminum alloy, or nickel-plated steel, or a pouch-shaped laminate film, or any other suitable material.

The cap assembly 20, in one embodiment, includes a plate-shaped cap plate 28 combined to an opening of the case 15. A sealing cap 27 may be provided at an electrolyte injection hole 29 of the cap plate 28. Furthermore, a vent plate 26 may be provided at the cap plate 28 with a notch 26a, which is formed at a vent hole 24 and is configured to open under a predetermined pressure.

In one embodiment, positive and negative terminals 21 and 22 are electrically connected to the electrode assembly 10 and protrude to the outside of the case 15.

The positive and negative terminals 21 and 22 pass through the cap plate 28 and, in one embodiment, flanges are formed under the positive and negative terminals 21 and 22 while being supported at the bottom of the cap plate 28, while the outer circumference of the upper pillars thereof that are protruded to the outside of the cap plate 28 are screw-fastened. Furthermore, nuts 35 may be coupled to the terminals 21 and 22 and supporting the terminals 21 and 22 from the top side.

Upper and lower gaskets 38 and 39, in one embodiment, are installed between the positive and negative terminals 21 and 22 and the cap plate 28 to seal and insulate the terminals 21 and 22 and the cap plate 28 from each other.

In one embodiment, the positive terminal 21 is electrically connected to the positive electrode 11 via a first lead tab 31, and the negative terminal 22 is electrically connected to the negative electrode 12 via a second lead tab 32.

A lower insulating member 34, in one embodiment, is disposed under the cap plate 28, and the bottom ends of the terminals 21 and 22 and the top ends of the lead tabs 31 and 32 are inserted into the lower insulating member 34.

According to the above-described structure, the first lead tab 31 electrically interconnects the positive terminal 21 and the positive electrode 11, and the second lead tab 32 electrically interconnects the negative terminal 22 and the negative electrode 12.

Figure 3:
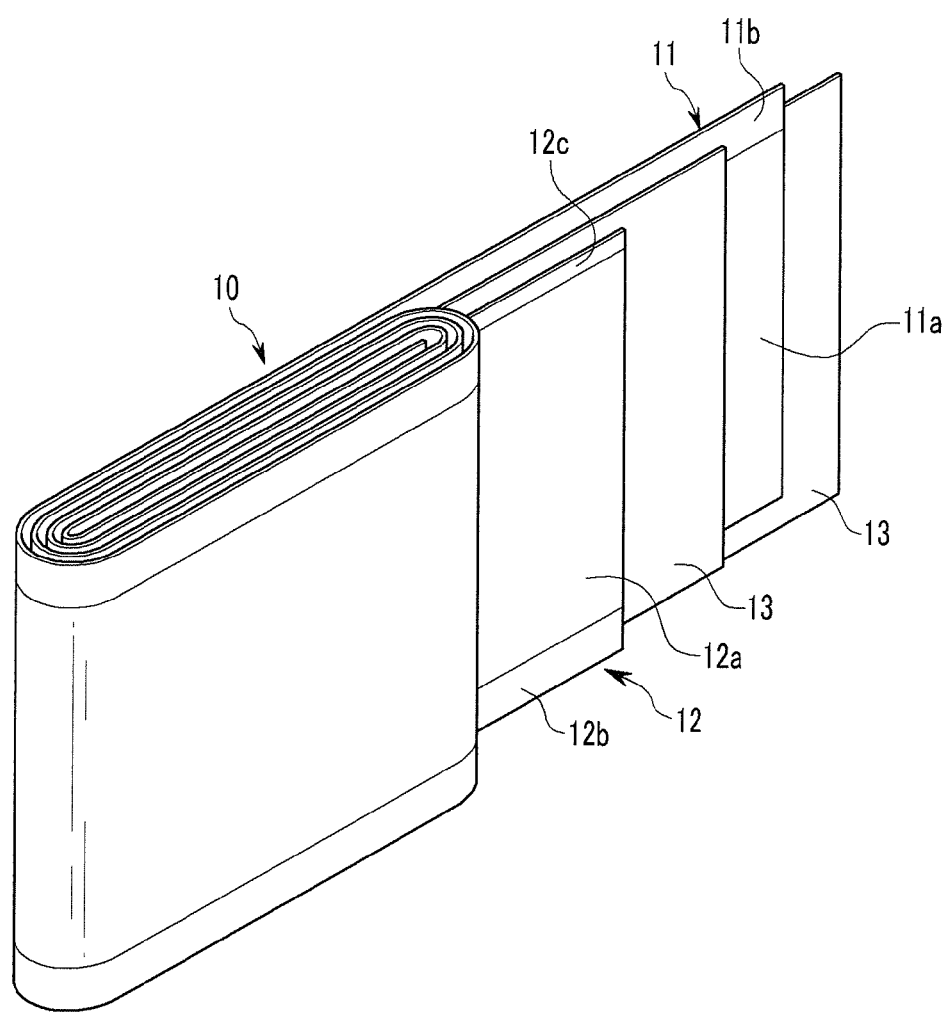
FIG. 3 is a perspective view of an electrode assembly according to another exemplary embodiment of the present invention.

As shown in FIG. 3, the electrode assembly 10, is structured such that the positive and negative electrodes 11 and 12 are wound while interposing a separator 13 therebetween. In one embodiment, the positive electrode 11, the negative electrode 12, and the separator 13 are band-shaped, and are elongated in a direction. However, the present invention is not limited thereto, and the electrode assembly 10 may be structured such that a plurality of positive and negative electrodes 11 and 12 are alternately deposited while interposing a separator 13 therebetween.

Figure 4A:
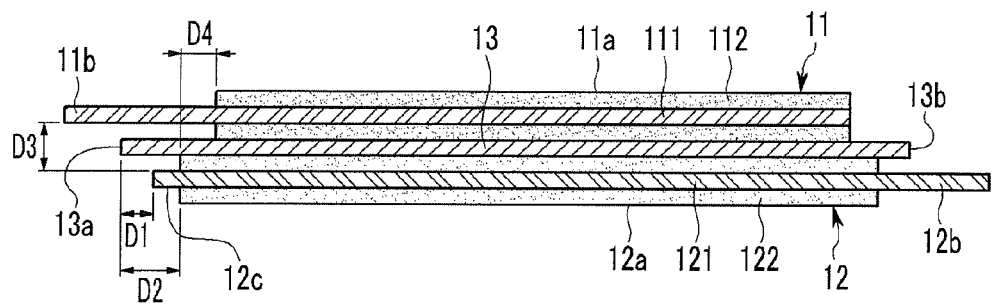
FIG. 4A and FIG. 4B are partial cross-sectional views of the electrode assembly of FIG. 3.

With reference to FIG. 4A, the positive electrode 11, in one embodiment, is structured such that a positive active material layer 112 is formed at both sides of a positive current collector 111. The positive current collector 111, in one embodiment, is band-shaped and made of a material such as aluminum or stainless steel. The positive active material layer 112, in one embodiment, is made of $LiCoO_2$, $LiMnO_2$, $LiFePO_4$, $LiNiO_2$, $LiMn_2O_4$, or a carbon-based active material, or a trivalent active material, a conductive agent, and a binder.

The negative electrode 12, in one embodiment, is structured such that a negative active material layer 122 is formed at both sides of a negative current collector 121. The negative current collector 121, in one embodiment, is band-shaped, and is made of a material such as copper, stainless steel, or aluminum. The negative active material layer 122, in one embodiment, is made of $Li_4Ti_5O_{12}$, a carbon-based material, a conductive agent, or a binder.

As shown in FIG. 3, a positive coating region 11a where the positive active material layer 112 is formed and a positive uncoated region 11b in which the positive current collector 111 is exposed are formed in the positive electrode 11. In the positive uncoated region 11b, the positive active material layer 112 is not formed. The positive uncoated region 11b extends along a length direction of the positive electrode 11 on one side (e.g., a first side) of the electrode assembly 10.

A negative coating region 12a where the negative active material layer 122 is formed, a first negative uncoated region 12c, and a second negative uncoated region 12b are formed in the negative electrode 12. In the first and second negative uncoated regions 12b and 12c, the negative active material layer 122 is not formed, and the negative current collector 121 is exposed in the first and second negative uncoated regions 12b and 12c. The first negative uncoated region 12c and the second negative uncoated region 12b extend along a length direction of the negative electrode 12 at respective sides thereof. The second negative uncoated region 12b, in one embodiment, is greater in width than the first negative uncoated region 12c.

The second negative uncoated region 12b is formed at an opposite side (e.g., a second side) to that where the positive uncoated region 11b is formed in the electrode assembly 10, and the first negative uncoated region 12c is formed at the same side (e.g., the first side) as that where the negative uncoated region 11b is formed. Here, the first and second negative uncoated regions 12b and 12c are at opposite ends of the electrode assembly 10 along a direction of a winding axis of the electrode assembly 10.

The separator 13, in one embodiment, has a structure in which a ceramic is included in a polymer porous membrane. The ceramic, in one embodiment, is embedded in the separator 13. As described, when the ceramic is included in the separator 13, a short-circuit of the positive and negative electrodes due to melting of the separator 13 at a high temperature can be prevented or reduced, and excessive contraction of the separator 13 at a high temperature can be prevented or substantially prevented.

In one embodiment, the separator 13 is made by mixing a ceramic material and a polymer material and processing them to have a desired shape of the separator 13. The polymer material of the separator 13 may include a polymer porous membrane, such as a polyolefin-based single or complex film, polyethylene, polypropylene, a manila paper, or any other suitable material. Further, the ceramic material of the separator 13 may include $Al_2O_3$, $SiO_2$, or any other suitable ceramic material. According to embodiments of the present invention, the contraction rate of the separator 13 at a high temperature can be controlled by adjusting the amount of the ceramic and the porosity.

Figure 4B:
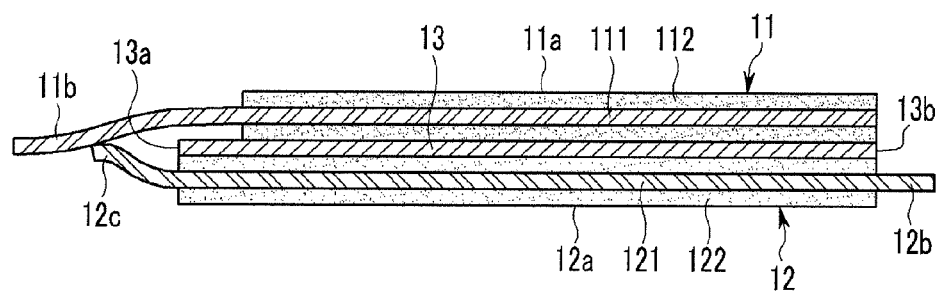

FIG. 4A and FIG. 4B show partial cross-sectional views of the electrode assembly 10 according to one exemplary embodiment of the present invention.

Referring to FIG. 4A and FIG. 4B, the electrode assembly 10 will be described in further detail.

According to one embodiment, when the electrode assembly 10 is initially manufactured, a side of the negative active material layer 122 protrudes more to the outside than the positive active material layer 112. In addition, the positive uncoated region 11b protrudes more to the outside than the first negative uncoated region 12c, and the separator 13 protrudes more to the outside than the first negative uncoated region 12c and less than the positive uncoated region 11b. Accordingly, the side of the separator is interposed between a side of the positive uncoated region 11b and a side of the first negative uncoated region 12c.

The separator 13, in one embodiment, contracts when the temperature increases and continuously contracts until the temperature reaches a reference temperature, such as 140° C., but does not further contract when the temperature is higher than the reference temperature.

If a lateral distance from a first side 13a of the separator 13 to the side of the first negative uncoated region 12c is D1 (see FIG. 4A), a lateral distance from the first side 13a of the separator 13 to the negative active material layer 122 is D2, and a moving distance of the first side 13a of the separator 13 according to contraction at the reference temperature is SQ, then, in one embodiment, SQ satisfies Equation 1.

$$D1 \leq SQ \leq D2 \qquad \text{Equation 1}$$

When the first side 13a of the separator 13 moves less than D1, an internal short-circuit is not induced and thus the rechargeable battery 110 may be left at a high temperature so that the rechargeable battery 110 may explode or combust, and when the first side 13a of the separator 13 moves farther than D2, the negative active material layer 122 and the positive uncoated region 11b are short-circuited so that the rechargeable battery 110 may explode or combust.

According to one embodiment, D1 is 0.5 mm to 10 mm, and D3 (see FIG. 4A), which is a distance between the positive uncoated region 11b and the first negative uncoated region 12c, is 0.05 mm to 0.5 mm.

According to one embodiment, D2 satisfies the equation: $D3 \leq D2 \leq 30$ mm. Also, in one embodiment, a length D4 (see FIG. 4A), which is a distance that the negative active material layer 122 is more protruded than the positive active material layer 112, is 0.05 mm to 0.5 mm.

In addition, in one embodiment, if an initial width of the separator 13 is SW1 and a ratio of contraction in width of the separator 13 until the temperature reaches the reference temperature (e.g., 140° C.) is SR1, SR1 satisfies Equation 2.

$$(2*D1/SW1)*100(\%) \leq SR1(\%) \leq (2*D2/SW1)*100(\%) \qquad \text{Equation 2}$$

When the separator 13 contracts, the first side 13a and a second side 13b of the separator 13 move in a direction toward the center of the separator 13 such that the first side 13a of the separator 13 moves further inside than the first negative uncoated region 12c when the separator 13 contracts more than twice D1. Accordingly, when the contraction ratio SR1 of the separator 13 is less than $(2*D1/W1)*100$, an internal short-circuit is not induced and thus the rechargeable battery 110 may be left at a high temperature, and when the contraction ratio SR1 is greater than $(2*D2/SW1)*100$, the negative active material layer 122 and the positive uncoated region 11b may be short-circuited.

As shown in FIG. 4B, when the separator 13 contracts within the above described range, the positive uncoated region 11b and the first negative uncoated region 12c are short-circuited so that an excessive increase of temperature of the electrode assembly 10 can be prevented or substantially prevented.

Figure 5:
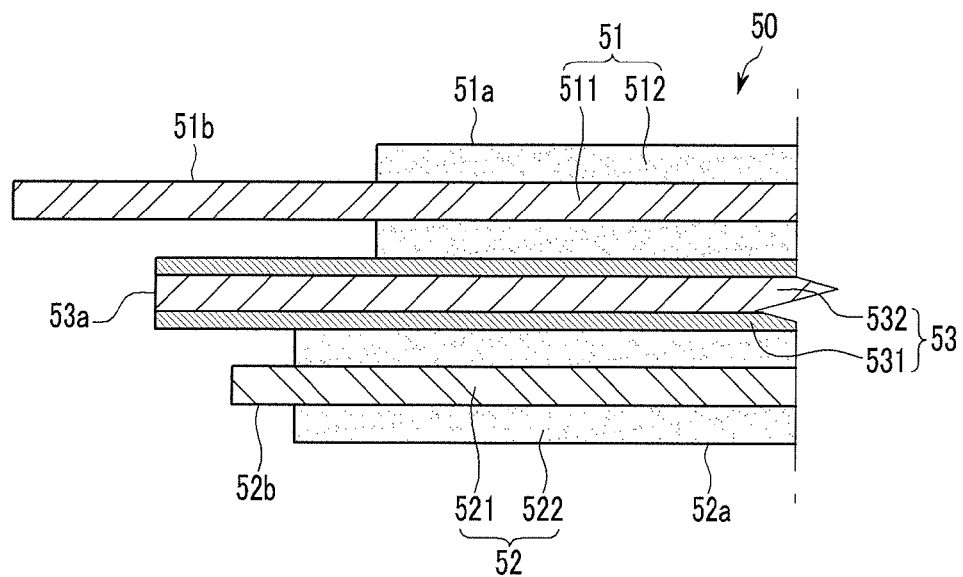
FIG. 5 is a partial cross-sectional view of an electrode assembly according to another exemplary embodiment of the present invention.

FIG. 5 is a partial cross-sectional view of an electrode assembly according to another exemplary embodiment of the present invention.

Referring to FIG. 5, an electrode assembly 50 according to one embodiment includes a positive electrode 51, a negative electrode 52, and a separator 53 disposed between the positive electrode 51 and the negative electrode 52.

The positive electrode 51, in one embodiment, includes a positive current collector 511 and a positive active material layer 512 formed at both sides of the positive current collector 511. In addition, a positive coated region 51a where the positive active material layer 512 is formed and a positive uncoated region 51b where the positive current collector 511 is exposed are formed in the positive electrode 51. In the positive uncoated region 51b, the positive active material layer 512 is not formed.

The negative electrode 52, in one embodiment, includes a negative current collector 521 and a negative active material layer 522 formed at both sides of the negative current collector 521. In addition, a negative coated region 52a where the negative active material layer 522 is formed and a first negative uncoated region 52b and a second negative uncoated region (not shown) through which the negative current collector 521 is exposed are formed in the negative electrode 52. In the first negative uncoated region 52b and the second negative uncoated region (not shown), the negative active material layer 522 is not formed.

The separator 53, in one embodiment, includes a porous member 532 and a ceramic layer 531 disposed at both sides of the porous member 532. In this case, the separator 53 may be manufactured through a wet etching process during which width-directional contraction occurs at a high temperature. The contraction ratio of the separator 53 at a high temperature can be controlled in various embodiments by adjusting the thickness of the ceramic layer.

The electrode assembly 50, in one embodiment, is formed having a structure in which the positive electrode 51, the negative electrode 52, and the separator 53 have a band shape and are stacked. The positive uncoated region 51b is formed at one side of the electrode assembly 50, and the second negative uncoated region (not shown) is formed at the other side thereof. In addition, the first negative uncoated region 52b is formed at the side where the positive uncoated region 51b is formed.

Both sides of the negative active material layer 522, in one embodiment, are more protruded to the outside than the positive active material layer 512. In addition, the positive uncoated region 51b protrudes more to the outside than the first negative uncoated region 52b, and the separator 53 protrudes to the outside more than the first negative uncoated region 52b and less than the positive uncoated region 51b. Therefore, one side 53a of the separator 53 is arranged between a side of the positive uncoated region 51b and a side of the first negative uncoated region 52b.

In one embodiment, when the separator 53 contracts in a high-temperature environment, the one side 53a of the separator 13 moves further inside than the side of the first negative uncoated region 52b, and, accordingly, the first negative uncoated region 52b and the positive uncoated region 51b are short-circuited, thereby preventing or substantially preventing excessive overheating. In addition, since the ceramic layer 531 is coated over the separator 53, the separator 53 is prevented or substantially prevented from being melted.

Figure 6:
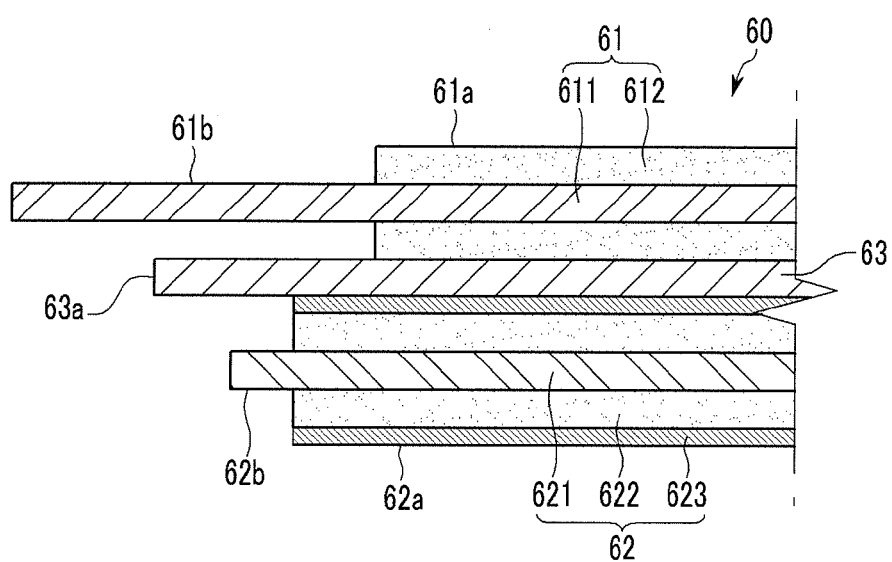
FIG. 6 is a partial cross-sectional view of an electrode assembly according to another exemplary embodiment of the present invention.

FIG. 6 is a cross-sectional view of an electrode assembly according to another exemplary embodiment of the present invention.

Referring to FIG. 6, an electrode assembly 60 according to one embodiment includes a positive electrode 61, a negative electrode 62, and a separator 63 disposed between the positive electrode 61 and the negative electrode 62.

The positive electrode 61, in one embodiment, includes a positive current collector 611 and a positive active material layer 612 formed at both sides of the positive current collector 611. In addition, a positive coated region 61a where the positive active material layer 612 is formed in the positive electrode 61, and a positive uncoated region 61b where the positive current collector 611 is exposed is formed therein. In the positive uncoated region 61b, the positive active material layer 612 is not formed.

The negative electrode 62, in one embodiment, includes a negative current collector 621, a negative active material layer 622 coated on the negative current collector 621, and a ceramic layer 623 coated on the negative active material layer 622. The negative current collector 621 and the negative active material layer 622 may be structured as described above with respect to the negative electrode 12. In one embodiment, the ceramic layer 623 is coated on the negative active material layer 622 and has an area corresponding to an area of the negative active material layer 622.

In addition, a negative coated region 62a where the negative active material layer 622 is formed and a first negative uncoated region 62b and a second negative uncoated region (not shown) in which the negative current collector 621 is exposed are formed in the negative electrode 62. In the first negative uncoated region 62b and the second negative uncoated region (not shown), the negative active material layer 622 is not formed. The second negative uncoated region (not shown) is greater than the first negative uncoated region 62b in width.

The electrode assembly 60, in one embodiment, has a structure in which the positive electrode 61, the negative electrode 62, and the separator 63 have a band shape and are stacked and then wound. The positive uncoated region 61b is formed at one side in a width direction of the electrode assembly 60, and the second negative uncoated region (not shown) is formed at the other side in the width direction of the electrode assembly 60. In addition, the first negative uncoated region 62b is formed at the side where the positive uncoated region 61b is formed.

Both sides of the negative active material layer 622, in one embodiment, are more protruded to the outside than the positive active material layer 612. In addition, the positive uncoated region 61b is more protruded than the first negative uncoated region 62b, and the separator 63 is protruded to the outside more than the first negative uncoated region 62b and less than the positive uncoated region 61b. Accordingly, one side 63a of the separator 63 is arranged between a side of the positive uncoated region 61b and a side of the first negative uncoated region 62b.

In one embodiment, when the ceramic layer 623 is formed on the negative active material layer 622, a short-circuit between the negative active material layer 622 and the positive active material layer 612 and a short-circuit between the negative active material 622 and the positive uncoated region 61b can be prevented or reduced. In addition, when the separator 63 contracts at a high temperature, the first negative uncoated region 62b and the positive uncoated region 61b are short-circuited, thereby preventing or substantially preventing excessive overheating.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly comprising:
a positive electrode comprising a positive current collector, a positive active material on the positive current collector in a positive coating region, and a positive uncoated region in which the positive active material is not on the positive current collector at a first side of the electrode assembly;
a negative electrode comprising a negative current collector, a negative active material on the negative current collector in a negative coating region, a first negative uncoated region in which the negative active material is not on the negative current collector at the first side of the electrode assembly, and a second negative uncoated region in which the negative active material is not on the negative current collector at a second side of the electrode assembly opposite the first side; and
a separator between the positive electrode and the negative electrode;
a case containing the electrode assembly and having an opening at an end thereof for receiving the electrode assembly;
a cap assembly comprising a cap plate sealing the opening; and a terminal electrically connected to the positive electrode or the negative electrode and protruding outside the case;

wherein the separator protrudes farther at the first side than the first negative uncoated region, and the positive uncoated region protrudes farther at the first side than the separator; and wherein the negative coating region protrudes farther at the first side than the positive coating region.

2. The rechargeable battery of claim 1, wherein the first negative uncoated region has a width that is less than a width of the second negative uncoated region.

3. The rechargeable battery of claim 1, wherein the following condition is satisfied:

$$D1 \le SQ \le D2,$$

where D1 is a lateral distance from the first negative uncoated region to an end of the separator at the first side, D2 is a lateral distance from the negative coating region to the end of the separator, and SQ is a lateral distance by which the end of the separator is thermally contracted at a reference temperature.

4. The rechargeable battery of claim 1, wherein a lateral distance from the first negative uncoated region to an end of the separator at the first side is about 0.5 mm to about 10 mm.

5. The rechargeable battery of claim 1, wherein a distance between the positive uncoated region and the first negative uncoated region is about 0.05 mm to about 0.5 mm.

6. The rechargeable battery of claim 1, wherein the following condition is satisfied:

$$D3 \le D2 \le 30 \text{ mm},$$

where D2 is a lateral distance from the negative coating region to an end of the separator at the first side, and D3 is a distance between the positive uncoated region and the first negative uncoated region.

7. The rechargeable battery of claim 1, wherein the following condition is satisfied:

$$(2*D1/SW1)*100(\%) \le SR1(\%) \le (2*D2/SW1)*100(\%),$$

where D1 is a lateral distance from the first negative uncoated region to an end of the separator at the first side, D2 is a lateral distance from the negative coating region to the end of the separator, SW1 is a width of the separator before the separator is thermally contracted, and SR1 is a percentage of contraction when the separator is thermally contracted at a reference temperature.

8. The rechargeable battery of claim 1, wherein the separator comprises a polymer membrane and a ceramic embedded therein.

9. The rechargeable battery of claim 1, wherein the separator comprises a porous member and ceramic layer thereon.

10. The rechargeable battery of claim 1, wherein the negative electrode comprises a ceramic layer on the negative active material.

11. The rechargeable battery of claim 1, wherein the first and second sides of the electrode assembly are at opposite ends of the electrode assembly along a direction of a winding axis of the electrode assembly.

12. A rechargeable battery comprising:
an electrode assembly comprising:
  a first electrode comprising a first current collector, a first active material on the first current collector in a first coating region, and a first uncoated region in which the first active material is not on the first current collector at one side of the electrode assembly;
  a second electrode comprising a second current collector, a second active material on the second current collector in a second coating region, a second uncoated region in which the second active material is not on the second current collector at the one side of the electrode assembly, the second uncoated region protruding farther at the one side than the first uncoated region; and
  a separator between the first electrode and the second electrode;
a case containing the electrode assembly; and
a terminal electrically connected to the first electrode or the second electrode and protruding outside the case;
wherein the separator protrudes farther at the one side than the first uncoated region;
wherein the second uncoated region protrudes farther at the one side than the separator; and
wherein the first coating region protrudes farther at the one side than the second coating region.

13. The rechargeable battery of claim 12, wherein the following condition is satisfied:

$$D1 \le SQ \le D2,$$

where D1 is a lateral distance from the first uncoated region to an end of the separator at the one side, D2 is a lateral distance from the first coating region to the end of the separator, and SQ is a lateral distance by which the end of the separator is thermally contracted at a reference temperature.

14. The rechargeable battery of claim 12, wherein a lateral distance from the first uncoated region to an end of the separator at the one side is about 0.5 mm to about 10 mm.

15. The rechargeable battery of claim 12, wherein a distance between the first uncoated region and the second uncoated region is about 0.05 mm to about 0.5 mm.

16. The rechargeable battery of claim 12, wherein the following condition is satisfied:

$$D3 \le D2 \le 30 \text{ mm},$$

where D2 is a lateral distance from the first coating region to an end of the separator at the one side, and D3 is a distance between the second uncoated region and the first uncoated region.

17. The rechargeable battery of claim 12, wherein the following condition is satisfied:

$$(2*D1/SW1)*100(\%) \le SR1(\%) \le (2*D2/SW1)*100(\%),$$

where D1 is a lateral distance from the first uncoated region to an end of the separator at the one side, D2 is a lateral distance from the first coating region to the end of the separator, SW1 is a width of the separator before the separator is thermally contracted, and SR1 is a percentage of contraction when the separator is thermally contracted at a reference temperature.

18. The rechargeable battery of claim 12, wherein the separator comprises a polymer membrane and a ceramic embedded therein.

19. The rechargeable battery of claim 12, wherein the separator comprises a porous member and a ceramic layer thereon.

20. The rechargeable battery of claim 12, wherein the first electrode comprises a ceramic layer on the first active material.

* * * * *